US012647611B2

(12) United States Patent
Mezghanni et al.

(10) Patent No.: US 12,647,611 B2
(45) Date of Patent: Jun. 2, 2026

(54) CANONICALIZED CODEBOOK FOR 3D OBJECT GENERATION

(71) Applicants: DASSAULT SYSTEMES, Velizy Villacoublay (FR); ECOLE POLYTECHNIQUE, Palaiseau Cedex (FR); CENTRE NATIONAL DE LA RECHERCHE SCIENTIFIQUE, Paris Cedex (FR)

(72) Inventors: Mariem Mezghanni, Vélizy-Villacoublay (FR); Kawtar Zaher, Vélizy-Villacoublay (FR); Malika Boulkenafed, Vélizy-Villacoublay Cedex (FR); Maks Ovsjanikov, Palaiseau Cedex (FR)

(73) Assignees: DASSAULT SYSTEMES, Vélizy Villacoublay (FR); ECOLE POLYTECHNIQUE, Palaiseau Cedex (FR); CENTRE NATIONAL DE LA RECHERCHE SCIENTIFIQUE, Paris Cedex (FR)

( * ) Notice: Subject to any disclaimer, the term of this patent is extended or adjusted under 35 U.S.C. 154(b) by 324 days.

(21) Appl. No.: 18/413,163

(22) Filed: Jan. 16, 2024

(65) Prior Publication Data

US 2024/0251103 A1      Jul. 25, 2024

(30) Foreign Application Priority Data

Jan. 25, 2023   (EP) ..................................... 23305095

(51) Int. Cl.
  H04N 19/597       (2014.01)
  G06T 17/00        (2006.01)
  H04N 19/94        (2014.01)

(52) U.S. Cl.
  CPC ........... H04N 19/597 (2014.11); G06T 17/00 (2013.01); H04N 19/94 (2014.11)

(58) Field of Classification Search
  None
  See application file for complete search history.

(56) References Cited

U.S. PATENT DOCUMENTS 11,869,149 B2 *   1/2024   Eckart ................. G06N 3/0464
11,893,498 B2 *   2/2024   Aliper ................... G06N 3/084
              (Continued)

FOREIGN PATENT DOCUMENTS

EP           1881458 A1       1/2008

OTHER PUBLICATIONS

Cheng et al. ("Autoregressive 3D Shape Generation via Canonical Mapping", arxiv.org, Cornell University Library, 201 Olin Library Cornell University Ithaca, NY 14853, Apr. 5, 2022, pp. 1-22) (Year: 2022).*

(Continued)

*Primary Examiner* — Anand P Bhatnagar
(74) *Attorney, Agent, or Firm* — Oblon, McClelland, Maier & Neustadt, L.L.P.

(57)          ABSTRACT

A computer-implemented method of machine-learning. The method includes obtaining a training dataset of 3D models of real-world objects. The method further includes learning, based on the training dataset and on a patch-decomposition of the 3D models of the training dataset, a finite codebook of quantized vectors and a neural network. The neural network comprises a rotation-invariant encoder. The rotation-invariant encoder is configured for rotation-invariant encoding of a patch of a 3D model into a quantized latent vector of the codebook. The neural network further includes a decoder. The decoder is configured for decoding a sequence of quantized latent vectors of the codebook into a (Continued)

Offline stage

Online stage

US 12,647,611 B2

Page 2

3D model. The sequence corresponds to a patch-decomposition. This constitutes an improved solution for 3D model generation.

20 Claims, 8 Drawing Sheets

(56) References Cited

U.S. PATENT DOCUMENTS

| | | | | |
|---|---|---|---|---|
| 11,985,319 | B2 * | 5/2024 | Besenbruch | G06N 3/0495 |
| 12,022,077 | B2 * | 6/2024 | Besenbruch | G06N 3/0464 |
| 12,175,641 | B2 * | 12/2024 | Mironica | G06N 3/045 |
| 12,256,075 | B2 * | 3/2025 | Besenbruch | H04N 19/503 |
| 12,307,379 | B2 * | 5/2025 | Aliper | G06N 3/047 |
| 12,311,954 | B2 * | 5/2025 | Kari | G06V 20/59 |
| 12,323,593 | B2 * | 6/2025 | Besenbruch | H04N 19/91 |
| 12,430,725 | B2 * | 9/2025 | Zheng | G06T 5/77 |
| 12,506,891 | B2 * | 12/2025 | Ikonin | H04N 19/46 |
| 2024/0056576 | A1 * | 2/2024 | Besenbruch | G06N 3/092 |
| 2024/0152763 | A1 * | 5/2024 | Aliper | G06N 3/09 |

OTHER PUBLICATIONS

Panos Achlioptas, et al.; "Learning representations and generative models for 3d point clouds"; arXiv preprint arXiv:1707.02392, 2017, No page range indicated. (18 pages).
Kaichun MO, et al.; "Structurenet: Hierarchical graph networks for 3d shape generation"; ACM Transactions on Graphics (TOG), Siggraph Asia 2019, 38(6):Article 242, 2019, pp. 1-29. (29 pages).
Jeong Joon Park, et al.; "Deepsdf: Learning continuous signed distance functions for shape representation"; In The IEEE Conference on Computer Vision and Pattern Recognition (CVPR), Jun. 2019, pp. 165-174. (10 pages).
Jan Bechtold, et al.; "Fostering generalization in single-view 3d reconstruction by learning a hierarchy of local and global shape priors"; In Proceedings of the IEEE/CVF Conference on Computer Vision and Pattern Recognition (CVPR), Jun. 2021, pp. 15880-15889. (10 pages).
Rohan Chabra et al.; "Deep local shapes: Learning local SDF priors for detailed 3d reconstruction"; European Conference on Computer Vision (ECCV), 2020, pp. 1-26. (26 pages).
Zhang Chen, et al.,; "Multiresolution Deep Implicit Functions for 3D Shape Representation"; In 2021 IEEE/CVF International Conference on Computer Vision, ICCV. IEEE, 2021, pp. 13087-13096. (10 pages).
Julian Chibane, et al.; " Implicit functions in feature space for 3d shape reconstruction and completion"; In Proceedings of the IEEE/CVF Conference on Computer Vision and Pattern Recognition (CVPR), Jun. 2020, No page range indicated. (12 pages).
Moritz Ibing, et al., "3d shape generation with grid-based implicit functions"; In Proceedings of the IEEE/CVF Conference on Computer Vision and Pattern Recognition (CVPR), Jun. 2021, pp. 13559-13568. (10 pages).
Chiyu Max Jiang, et al.; "Local implicit grid representations for 3d scenes"; In Proceedings IEEE Conf. on Computer Vision and Pattern Recognition (CVPR), 2020, pp. 6001-6010. (10 pages).
Edgar Tretschk, "Patchnets: Patch-based generalizable deep implicit 3d shape representations"; European Conference on Computer Vision (ECCV), 2020, pp. 1-25. (25 pages).
Shun Yao, et al.; "3d shapes local geometry codes learning with sdf", In Proceedings of the IEEE/CVF International Conference on Computer Vision (ICCV) Workshops, Oct. 2021, pp. 2110-2117. (8 pages).
Ashish Vaswani, et al.; "Attention is all you need", In I. Guyon, U. Von Luxburg, S. Bengio, H. Wallach, R. Fergus, S. Vishwanathan, and R. Garnett, editors, Advances in Neural Information Processing Systems, vol. 30. Curran Associates, Inc., 2017, pp. 1-11. (11 pages).

Aaron van den Oord, et al.; "Neural discrete representation learning"; In Advances in Neural Information Processing Systems, 2017, pp. 1-10. (10 pages).
Paritosh Mittal, et al.; "AutoSDF: Shape priors for 3d completion, reconstruction and generation", In CVPR, 2022, pp. 306-315. (10 pages).
James Lucas, et al.; "Understanding posterior collapse in generative latent variable models";ICLR 2019, pp. 1-16. (16 pages).
Yixin Wang, et al.; "Posterior collapse and latent variable non-identifiability", In Advances in Neural Information Processing Systems, vol. 34, Curran Associates, Inc., 2021, pp. 1-13. (13 pages).
Ali Razavi, et al.; "Generating diverse high-fidelity images with vq-vae-2"; In Advances in Neural Information Processing Systems, vol. 32. Curran Associates, Inc., 2019, pp. 1-11. (11 pages).
Chieh-Hsin Lai, et al.; "Robust vector quantized-variational autoencoder"; CoRR, abs/2202.01987, 2022, No page range identified. (14 pages).
Patrick Esser, et al.; "Taming transformers for high-resolution image synthesis"; 2020, pp. 12873-12883. (11 pages).
Katherine Crowson, et al., "Vqgan-clip: Open domain image generation and editing with natural language guidance"; 2022, pp. 1-32. (32 pages).
Xingguang Yan, et al.; Shapeformer: Transformer-based shape completion via sparse representation; In Proceedings of the IEEE/CVF Conference on Computer Vision and Pattern Recognition, 2022, pp. 6239-6249. (11 pages).
Biao Zhang, et al.; "3dilg: Irregular latent grids for 3d generative modeling"; arXiv preprint arXiv:2205.13914, 2022, pp. 1-14. (14 pages).
Haozhe Xie, et al.; "Pix2vox: Context-aware 3d reconstruction from single and multi-view images"; In Proceedings of the IEEE/CVF International Conference on Computer Vision (ICCV), 2019, pp. 2690-2698. (9 pages).
Nathaniel Thomas, et al.; "Tensor field networks: Rotation- and translation-equivariant neural networks for 3d point clouds", 2018, pp. 1-19. (19 pages).
Leon Lang, et al., "A Wigner-Eckart Theorem for Group Equivariant Convolution Kernels"; In International Conference on Learning Representations, 2021, pp. 1-100. (100 pages).
Rahul Sajnani, "Condor: Self-supervised canonicalization of 3d pose for partial shapes"; In The IEEE Conference on Computer Vision and Pattern Recognition (CVPR), Jun. 2022, No. page range identified. (17 pages).
Kaiming He, et al.; "Deep residual learning for image recognition"; In Proceedings of the IEEE Conference on Computer Vision and Pattern Recognition (CVPR), Jun. 2016, pp. 770-778. (9 pages).
Charles R Qi, et al.; "Pointnet: Deep learning on point sets for 3d classification and segmentation"; Proc. Computer Vision and Pattern Recognition (CVPR), IEEE, 2017., pp. 652-660. (9 pages).
Ari Holtzman, et al., "The curious case of neural text degeneration"; In International Conference on Learning Representations, 2020, pp. 1-16. (16 pages).
Angel X. Chang, et al.; "ShapeNet: An information-rich 3D model repository"; arXiv preprint, Dec. 2015, pp. 1-11. (11 pages).
Weiyue Wang, et al.; "Disn: Deep implicit surface network for high-quality single-view 3d reconstruction"; In H.Wallach, H. Larochelle, A. Beygelzimer, F. d'Alch'e-Buc, E. Fox, and R. Garnett, editors, Advances in Neural Information Processing Systems, vol. 32. Curran Associates, Inc., 2019, pp. 1-11. (11 pages).
Maxim Tatarchenko et al., "What do single-view 3d reconstruction networks learn?"; In Proceedings of the IEEE Conference on Computer Vision and Pattern Recognition (CVPR), 2019, page range not identified. (22 pages).
D. E. Rumelhart et al.; "Learning internal representations by error propagation", Parallel distributed processing: explorations in the microstructure of cognition, vol. 1: foundations, MIT Press, Cambridge, MA, 1986, No page range identified. (49 pages).
Extended (Supplementary)European Search Report dated Jun. 28, 2023, issued in counterpart EP Application No. 23305395.4, citing document No. 28, 37, 38 and 39. (9 pages).

(56) References Cited

OTHER PUBLICATIONS

An-Chieh Cheng et al: "Autoregressive 3D Shape Generation via Canonical Mapping", arxiv.org, Cornell University Library, 201 Olin Library Cornell University Ithaca, NY 14853, Apr. 5, 2022, pp. 1-22. (22 pages).

Tristan Aumentado-Armstrong et al: "Disentangling Geometric Deformation Spaces in Generative Latent Shape Models", arxiv.org, Cornell University Library, 201 Olin Library Cornell University Ithaca, NY 14853, Feb. 27, 2021, pp. 1-22. (22 pages).

Weiwei Sun et al: "Canonical Capsules: Self-Supervised Capsules in Canonical Pose", arxiv.org, Cornell University Library, 201 Olin Library Cornell University Ithaca, ny 14853, Nov. 24, 2021, pp. 1-16. (16 pages).

* cited by examiner

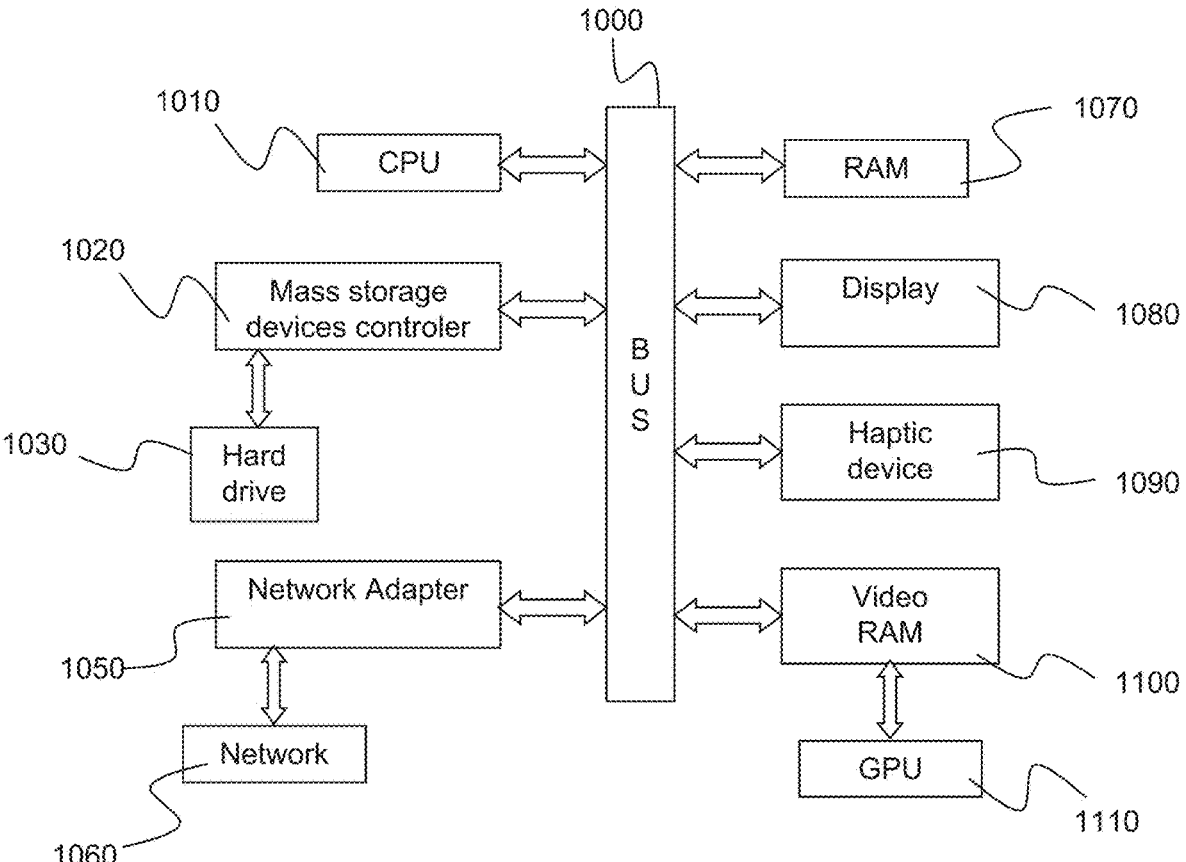
<u>FIG. 9</u>

CANONICALIZED CODEBOOK FOR 3D OBJECT GENERATION

CROSS REFERENCE TO RELATED APPLICATIONS

This application claims priority under 35 U.S.C. § 119 or 365 European Application No. 23305095.4 filed Jan. 25, 2023. The entire contents of the above application are incorporated herein by reference.

TECHNICAL FIELD

The disclosure relates to the field of computer programs and systems, and more specifically to methods, a system and a program for machine-learning.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Within this context and other contexts, 3D model generation is gaining wide importance. There is however a need for improved solutions for 3D model generation.

SUMMARY

It is therefore provided a computer-implemented method of machine-learning. The method comprises providing a training dataset of 3D models of real-world objects. The method further comprises learning, based on the training dataset and on a patch-decomposition of the 3D models of the training dataset, a finite codebook of quantized vectors and a neural network. The neural network comprises a rotation-invariant encoder. The rotation-invariant encoder is configured for rotation-invariant encoding of a patch of a 3D model into a quantized latent vector of the codebook. The neural network further comprises a decoder. The decoder is configured for decoding a sequence of quantized latent vectors of the codebook into a 3D model. The sequence corresponds to a patch-decomposition.

The method may comprise one or more of the following:

- the encoder is translation-invariant and rotation-invariant and is configured for translation-invariant and rotation-invariant encoding of a patch of a 3D model of the training dataset into a quantized latent vector of the codebook;
- the decoder comprises
  - a first module configured for taking as input a sequence of quantized latent vectors of the codebook corresponding to a patch-decomposition and inferring patches rotations for reconstructing a 3D model; and
  - a second module configured for taking as input the sequence of quantized latent vectors of the codebook corresponding to the patch-decomposition and inferring patches geometries for reconstructing a 3D model;
- the learning comprises minimizing a loss, the loss comprising a reconstruction loss and a commitment loss, the commitment loss rewarding consistency between quantized latent vectors outputted by the encoder and vectors of the codebook; and/or
- the loss is of the type:

$$\mathcal{L}(x; \phi, \psi, D) = \mathcal{L}_r(o_x, \hat{o}_x) + \beta \mathcal{L}_{VQ}(Z, Z^q)$$

where $\mathcal{L}_r$ is a reconstruction binary cross-entropy loss, $\mathcal{L}_{VQ}$ is a commitment loss, x represents a 3D point, $\psi$ represents the parameter of the decoder, $\beta$ is a weighting parameter, $\hat{o}_x$ represents a ground truth occupancy for x, $o_x$ represents a predicted occupancy for x, $\phi$ represents the parameter of the encoder, and where $$\mathcal{L}_{VQ}(Z, Z^q) = \|Z - sg[Z^q]\|_2^2$$

where sg[.] denotes the stop-gradient operation, $$Z = \{z_i\}_i, Z^q = \{z_i^q\}_i,$$

where $z_i$ is a non-quantized encoding of $X_i$ and where $$VQ(z_i) = z_i^q = \mathrm{argmin}_{e \in D}\|z_i - e\|$$

where $D = \{e_k \in R^D\}$; $k = 1 \ldots K$ is the codebook.

It is further provided a neural network function comprising a decoder and a codebook learnable according to the method. The neural network function may further comprise an encoder learnable according to the method. The encoder and the decoder may form an autoencoder neural network.

It is further provided a computer-implemented method of use of the decoder and the codebook. The method of use comprises obtaining a sequence of quantized latent vectors of the codebook. The method of use further comprises applying the decoder to the sequence.

The method of use may comprise one or more of the following:

obtaining the sequence comprises:

applying a transformer neural network to obtain the sequence, the transformer neural network being configured for, given an input latent vector representing an input 3D model, generating a sequence of quantized latent vectors of the codebook that correspond to a patch-decomposition of the input 3D model;

the latent vector representing the input 3D model corresponds to an embedding of an image or point cloud representing the input 3D model;

the image is a single-view image or the point cloud is a partial point cloud; and/or obtaining the sequence comprises applying the encoder to a patch-decomposition of an input 3D model.

The method or the method of use may further comprise learning the transformer neural network.

It is further provided a computer program comprising instructions for performing the method and/or the method of use.

It is further provided computer-readable data storage medium having recorded thereon the computer program and/or the neural network function.

It is further provided a device comprising the computer-readable data storage medium.

The device may form or serve as a non-transitory computer-readable medium, for example on a Saas (Software as a service) or other server, or a cloud based platform, or the like. The device may alternatively comprise a processor coupled to the data storage medium. The device may thus form a computer system in whole or in part (e.g., the device is a subsystem of the overall system). The system may further comprise a graphical user interface coupled to the processor. It is thus also provided a computer system comprising a processor coupled to a memory, the memory having recorded thereon the computer program and/or the neural network function.

BRIEF DESCRIPTION OF THE DRAWINGS

Non-limiting examples will now be described in reference to the accompanying drawings, where:

FIG. 9 shows an example of the system.

DETAILED DESCRIPTION

Figure 1:
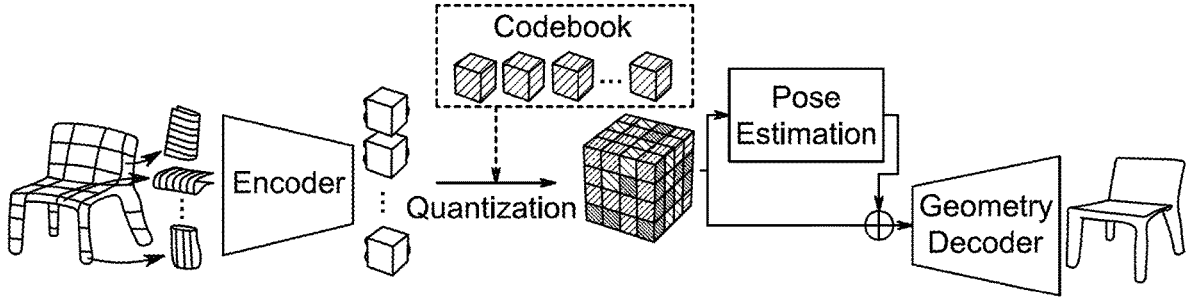
FIGS. 1, 2, 3, 4, 5, 6, 7, and 8 illustrate the methods.

Described is a computer-implemented method of machine-learning. The method comprises providing a training dataset of 3D models of real-world objects. The method further comprises learning, based on the training dataset and on a patch-decomposition of the 3D models of the training dataset, a finite codebook of quantized vectors and a neural network. The neural network comprises a rotation-invariant encoder. The rotation-invariant encoder is configured for rotation-invariant encoding of a patch of a 3D model into a quantized latent vector of the codebook. The neural network further comprises a decoder. The decoder is configured for decoding a sequence of quantized latent vectors of the codebook into a 3D model. The sequence corresponds to a patch-decomposition. The method may be referred to as "the learning method".

The learning method constitutes an improved solution for 3D model generation.

Indeed, the method learns an encoder configured for encoding of a patch of a 3D model into a quantized latent vector of the codebook, and a decoder configured for decoding a sequence of quantized latent vectors of the codebook that corresponds to a patch-decomposition (i.e., into a 3D model to which the patch-decomposition corresponds). The trained decoder may thus be used for reconstruction and/or generation of a 3D model based on an encoding of a patch-decomposition thereof. The use of patch-decomposition for training the neural network allows the neural network to be agnostic to the object categories (e.g., plane, car, chair) to which the various 3D models belong: the patches that are used correspond to local parts of the 3D models, and thus the method trains the neural network to encode and decode locally the 3D models, that is by considering local geometry and topology rather than a global topology and geometry of the models. Since local geometries and topologies are not in general specific to one object category or another, contrary to the global geometries and topologies of the models, the network are thus trained to be agnostic to the 3D models' categories.

Furthermore, the method does not teach the neural network to encode and decode continuous latent vectors, that is latent vectors having coordinates belonging taking continuous (i.e., non-discrete) values. The method teaches instead the encoder to encode patches into quantized, i.e., discrete, latent vectors of the codebook, and teaches the decoder to decode sequences of such vectors. The method also uses the training dataset to learn the codebook, the codebook thereby comprising quantized vectors corresponding to (i.e., learned through) the encoding of the models of the training dataset. Thus, the method does not learn continuous latent vectors to be decoded into 3D models, but rather a finite and canonical codebook of discrete latent vectors that are combinable into sequences to be decoded into patch decompositions to form 3D models. This use of a codebook allows to use a canonical and compact latent space rather than a continuous one, which saves memory space and usage during both the training and the use of the learnt network and codebook. In other words, the method provides a machine-learning framework designed with the consideration of saving memory space and usage.

Moreover, with the purpose of further reducing memory space and usage, the method learns an encoder that is configured for rotation-invariant encoding of a patch. In other words, given two patches which are the images of one-another by a rotation transformation, the encoder encodes them into a same latent vector. Now, since patches represents local parts, for a given 3D model there are in general patches which are the images of one another by a rotation. For example, the two top corners of a chair back may have the same geometry, up to a rotation. The encoder learnt by the method encodes these corners with a same latent vector. This rotation-invariant encoder reduces the number of latent vectors necessary to fully encode the training dataset patches, i.e., reduces the size of the codebook, makes it more compact. This allows to further save memory space and usage. In examples, the encoder is furthermore translation-invariant, which makes the codebook even more compact (as two patches which are the images of one another by a translation have the same encoding), which allows save even more memory space and usage.

In other words, the learning method allows to automatically learn a fixed-size N compact codebook of discrete representations in $\mathbb{R}^D$ ($D \in \mathbb{N}^*$) associated with 3D local surface patches, that allows to generate plausible novel shapes by selecting and assembling items from the said codebook. Tests provided in the present disclosure for implementations of the method show how the present method allows to improve the expressiveness and quality of the learned codebook without augmenting N and D to avoid increasing the memory and computational costs. The method offers a novel discrete local representation that accounts for local 3D pose changes, allowing a more accurate and efficient formulation. Indeed, unlike the continuous latent representations, discrete ones allow to compactly and efficiently embed 3D geometries. Within this context, existing methods ignore the ambiguities inherent to 3D geometry, especially related to possible translation and rotation on local and global levels. As a result, such techniques may require very large codebooks to capture all possible variability in both geometry and pose. The method proposes a novel local-based generative model that improves the generation quality by compactly embedding local geometries in a rotation-invariant (and optionally translation-invariant) manner. This strategy enables the codebook of discrete codes to express a larger range of local geometric forms by avoiding redundancies induced by changes in pose, and, hence, the increase in memory and computational costs. The method may thereby efficiently be applied to the field of automatic data generation, in which one aims at automatically generating 3D shapes from multiple categories for the tasks of shape optimization, single-view reconstruction and shape completion.

The learning method is a method of machine-learning.

As known per se from the field of machine-learning, the processing of an input by a neural network includes applying operations to the input, the operations being defined by data including weight values. Learning a neural network thus includes determining values of the weights based on a dataset configured for such learning, such a dataset being possibly referred to as a learning dataset or a training dataset. For that, the dataset includes data pieces each forming a respective training sample. The training samples represent the diversity of the situations where the neural network is to be used after being learnt. Any training dataset herein may comprise a number of training samples higher than 1000, 10000, 100000, or 1000000. In the context of the present disclosure, by "learning a neural network based on a dataset", it is meant that the dataset is a learning/training dataset of the neural network, based on which the values of the weights (also referred to as "parameters") are set.

In the context of the learning method, the training dataset is the provided dataset of 3D models, which is now discussed. Prior to the discussion on the providing of the dataset, data structures involved therein are now discussed.

Each 3D model herein is a 3D representation of a real-world object. Each 3D model herein may be a 3D point cloud. A 3D point cloud is an unordered set of points with coordinates in 3D, that may be accompanied with additional characteristics such as intensity or color. Each 3D model herein may alternatively be a 3D mesh. A 3D mesh is a collection of vertices, edges and faces that define a shape. The faces may consist of triangles (triangle mesh), quadrilaterals (quads), or other simple convex polygons (n-gons), since this simplifies rendering, but may also be more generally composed of concave polygons, or even polygons with holes. Any 3D model herein may alternatively be an implicit 3D representation by an implicit function. Such function is a function defined over the 3D space where a shape surface corresponds the isosurface of this function. The isosurface is a surface that represents points of a constant value (e.g., distance to the shape surface) within a volume of space. In other words, it is a level set of a continuous function whose domain is 3D-space. Any 3D model herein may alternatively be a CAE model or CAD model (for example a B-rep model). The 3D models of the training dataset may all be of the same type (e.g., all point clouds or meshes). The neural network may be configured to take as input 3D point clouds and no other type of geometrical representation. In such a case, the 3D models of the training dataset may all be 3D point clouds, or, for any 3D model therein that is not a 3D point cloud, the method may comprise transforming the 3D model into a 3D point cloud, for example using any appropriate sampling method. More generally, for any neural network or function herein that takes as input a 3D point cloud, the function may nevertheless be applied to the 3D model after an transformation of the latter into a 3D point cloud using an appropriate method;

Providing the training dataset may comprise obtaining (e.g., downloading) at least a part (e.g., all) of the 3D models from a (e.g., distant) memory or server or database on which the 3D models are stored. The models may for example be obtained from the ShapeNet dataset, which is discussed hereinafter. Providing the training dataset may comprise performing the patch-decomposition (also referred to as splitting) which is discussed hereinafter, thereby obtaining patches and patches-decomposition of the models. Alternatively, performing the patch-decomposition may be performed as an intermediate step between the providing of the training dataset and the learning. The models of the training dataset may represent real-world objects of several categories, for example of 13 categories, for example airplane, bench, cabinet, car, chair, display, lamp, speaker, rifle, sofa, table, phone and watercraft.

Further to the providing of the training dataset, the method comprises learning, based on the training dataset, the finite codebook of quantized vectors and the neural network. The learning is based on a patch-decomposition of the 3D models of the training dataset. This means that the learning does not directly manipulate or use the full 3D models, but uses and manipulates patch-decompositions thereof.

For any 3D model herein, the 3D model is either a 3D point cloud or transformed into a 3D point cloud prior to being fed to any neural network herein that takes as input 3D point clouds only. The patch-decomposition of the 3D model is a decomposition of the 3D point cloud (i.e., the model or the 3D point cloud into which the model is transformed) into regular voxel regions.

The method may comprise, prior to the learning, for each 3D point cloud of the training dataset, splitting the 3D point cloud into regular voxel regions of a predetermined resolution, by any suitable method for performing such splitting.

The patches are elementary surfaces. The patches may be these regular voxel regions. Alternatively, a patch may be a parametric elementary surface that may be controlled via a grid of control points whereby the patch can be deformed. The patch-decomposition of a 3D model/3D point cloud may thus be a regular voxel decomposition of predetermined resolution of the 3D model/3D point cloud. Let $X \in R^{N \times 3}$ be the 3D point cloud. The patches may then be denoted $\{X_i\}_i = 1 \ldots k^3$, where k is the resolution. It is to be understood that the voxel regions may split a 3D space that comprises the 3D point cloud, i.e., there are patches that each include a respective part of the point cloud and other patches that include respective parts of the 3D space but no point of the point cloud. The learning is performed in such a manner that the encoder encodes these other patches as the null vector (i.e., the vector with all coordinates set to 0).

The neural network is a Deep Neural Network (DNN). DNNS are discussed in reference D. E. Rumelhart, G. E. Hinton, R. J. Williams, "*Learning internal representations by error propagation*", Parallel distributed processing: explorations in the microstructure of cognition, vol. 1: foundations, MIT Press, Cambridge, MA, 1986, which is incorporated herein by reference. DNNs are a powerful set of techniques for learning in Neural Networks, which is a biologically-inspired programming paradigm enabling a computer to learn from observational data. In object recognition, the success of DNNs is attributed to their ability to learn rich midlevel media representations as opposed to hand-designed low-level features (Zernike moments, HOG, Bag-of-Words, SIFT) used in other methods (min-cut, SVM, Boosting, Random Forest). More specifically, DNNs are focused on end-to-end learning based on raw data. In other words, they move away from feature engineering to a maximal extent possible, by accomplishing an end-to-end optimization starting with raw features and ending in labels.

The neural network comprises the encoder and the decoder. The neural network may thus be an autoencoder.

The encoder takes as input a patch of a 3D model and outputs a quantized (i.e., discrete) latent vector of the codebook that is an encoding of the input patch. The concepts of encoding and latent vectors are known per se in machine-learning. The encoder is rotation-invariant, which means that two patches which are the image of one another by a rotation have the same encoding, i.e., are encoded in a same latent vector. The encoder may be translation-invariant and rotation-invariant and may thus be configured for translation-invariant and rotation-invariant encoding of a patch of a 3D model of the training dataset into a quantized latent vector of the codebook. This means that two patches which are the image of one another by a rotation, a translation, or a combination of one or more translations and one or more rotations, have the same encoding, i.e., are encoded in a same latent vector.

The encoder may be the composition of a Tensor Field Network, a local encoder, and a quantization operator.

The Tensor Field Network (TFN) is a Convolutional Neural Network (CNN) that defines point convolution operation as the product of a learnable radial function and spherical harmonics. Using the TFN allows to process patches (and, more generally, point cloud shapes) in a permutation-invariant, translation- and rotation-equivariant way. TFNs are discussed in the reference Nathaniel Thomas, Tess E. Smidt, Steven Kearnes, Lusann Yang, Li Li, Kai Kohlhoff, and Patrick Riley, "*Tensor field networks: Rotation- and translation-equivariant neural networks for 3d point clouds*", 2018, which is incorporated herein by reference.

Given a point cloud $P \in R^{N \times 3}$, TFN computes, for a spherical harmonics order $\ell$, an embedding $F^\ell(P) \in R^{(2\ell+1) \times C}$ where C is a user-defined number of channels. $F^\ell(P)$ satisfies the rotation equivariance property $F^\ell(RP) = D^\ell(R) F^\ell(P)$ where $R \in SO(3)$ and $D^\ell: SO(3) \to SO(2\ell+1)$ is the so-called Wigner matrix of degree $\ell$ (discussed in references Leon Lang and Maurice Weiler, "*A Wigner-Eckart Theorem for Group Equivariant Convolution Kernels*", In International Conference on Learning Representations, 2021, and Rahul Sajnani, Adrien Poulenard, Jivitesh Jain, Radhika Dua, Leonidas J. Guibas, and Srinath Sridhar, "*Condor: Self-supervised canonicalization of 3d pose for partial shapes*", in The IEEE Conference on Computer Vision and Pattern Recognition (CVPR), June 2022, which are both incorporated herein by reference). Observing that the features of $F^\ell(P)$ have the same rotation equivariance property as the vectors of degree $\ell$ spherical harmonics $Y^\ell(P) \in R^{(2\ell+1) \times N}$ where $Y^\ell(.)$ denotes the spherical har-

8 monic polynomials of degree $\ell$ (discussed in previously-cited reference Rahul Sajnani, Adrien Poulenard, Jivitesh Jain, Radhika Dua, Leonidas J. Guibas, and Srinath Sridhar, "*Condor: Self-supervised canonicalization of 3d pose for partial shapes*", in The IEEE Conference on Computer Vision and Pattern Recognition (CVPR), June 2022), a rotation-invariant feature vector $S^\ell(P)$ can be computed as:

$$S^\ell(P) = Y^\ell(P)^T F^\ell(P) \in R^{N \times C}.$$

Key to this observation is the idea that the product of an equivariant signal by the transpose of an equivariant signal is rotation-invariant (discussed in previously-cited reference Rahul Sajnani, Adrien Poulenard, Jivitesh Jain, Radhika Dua, Leonidas J. Guibas, and Srinath Sridhar, "*Condor: Self-supervised canonicalization of 3d pose for partial shapes*", in The IEEE Conference on Computer Vision and Pattern Recognition (CVPR), June 2022):

$$S^\ell(RP) = Y^\ell(RP)^T F^\ell(RP) = Y^\ell(P)^T D^\ell(R)^T D^\ell(R)$$
$$F^\ell(P) = S^\ell(P)$$

for $R \in SO(3)$. The method may leverage $S^\ell(.)$ to define the latent space, as follows.

The local encoder $E_\Phi$, with learnable parameters $\Phi$, takes as input each patch $X_i$ independently to compute latent representations as follows:

$$z_i = E_\Phi(X_i) = \text{concat}_{1 \ldots L}\left[ \max_{j=1 \ldots N} S^\ell_j(X_i - v_i) \right]$$

with $v_i \in R^3$ the $i^{th}$ grid center position of the patch. $z_i$ inherits the rotation invariance for $S^\ell(.)$. Besides, by construction, $z_i$ is translation and permutation invariant due to the centering and max pooling operations respectively. By "permutation", it is meant a permutation of the points $x \in X_i$. The independent encoding ensures that the learned discrete latent space only captures the local context, which benefits its generalization power across different objects categories. Besides, compared to global shape embeddings, this local and independent setting concentrates the impact of noisy and partial regions at the level of individual patch embeddings, since only the encodings of these regions are affected. This particularly enhances many tasks such as shape auto-encoding and completion.

The quantization operator VQ allows to avoid working directly on the continuous embeddings $\{z_i\}_i$, by transforming the high-dimensional continuous representations to a more compact latent space greatly reducing the size and number of latent variables. Ultimately, this allows to efficiently learn the space of plausible distributions of discrete codes, using for example the highly expressive Transformer architecture (discussed in reference Ashish Vaswani, Noam Shazeer, Niki Parmar, Jakob Uszkoreit, Llion Jones, Aidan N Gomez, Łukasz Kaiser, and Illia Polosukhin. "*Attention is all you need*", In I. Guyon, U. Von Luxburg, S. Bengio, H. Wallach, R. Fergus, S. Vishwanathan, and R. Garnett, editors, *Advances in Neural Information Processing Systems*, volume 30, Curran Associates, Inc., 2017, which is incorporated herein by reference). As discussed in the work VQ-VAE of reference Aaron van den Oord, Oriol Vinyals, and koray kavukcuoglu, "*Neural discrete representation learning*", In Advances in Neural Information Processing Systems, 2017, which is incorporated herein by reference, the method may comprise defining a discrete latent space of K vectors, each of dimension D: $e \in R^{K \times D}$ stacked in the learnable codebook $D = \{e_k \in R^D\}$; $k=1 \ldots K$. The encoder may consist in applying the operator VQ to the local encoder $E_\Phi$, such that each computed continuous embedding $z_i$ is thus vector-quantized into the closest vector in D in terms of the L2-norm:

$$VQ(z_i) = z_i^q = \text{argmin}_{e \in D} \|z_i - e\|.$$

The method may ensure gradient backpropagation through the non-differentiable VQ operator via the straight-through gradient technique which copies the decoder gradient at $$z_i^q$$

to $z_i$ at the backward stage, enabling an end-to-end training of the model.

The codebook is a learnable finite set of quantized (discrete) vectors, for example consisting of a matrix of these vectors, that the method learns. The codebook is trained to include the image of the encoder, i.e., the codebook is trained with the objective that the quantized vectors of the codebook include at least the vectors that are the images of the patches of the models of the training dataset through the encoding performed by the encoder. The codebook may however include other vectors. The method learns the codebook and the neural network in a same learning: the method trains the encoder to encode patches into vectors of the codebook, and as well trains the codebook (i.e., modifies the vectors' coordinates therein) to comprise vectors consistent with the encoding performed by the encoder. The vectors of the learnt codebook may thus be combined into sequences of quantized latent vectors, and as these vectors correspond to patches of the models (i.e., they are learnt to be encoding of such patches) of the training dataset, these sequences correspond to patch-decompositions of 3D models.

The decoder is configured for decoding a sequence of quantized latent vectors of the codebook into a 3D model. Such sequence corresponds to a patch-decomposition of the 3D model. This means that the decoder is trained to take as input a sequence of quantized latent vectors of the codebook, each vector of the sequence thus representing the encoding of a patch of a 3D model, the sequence thus representing a patch decomposition of this 3D model, and to decode the sequence into this 3D model. The method may train the decoder to decode each vector into the corresponding patch by determining the geometry that the vector encodes and by determining whether this geometry is the image of the geometry of another patch through a rotation, a translation, or a combination of rotations and translations. The decoder may for that comprise a first module and a second module. The first module is configured for (i.e., trained for) taking as input a sequence of quantized latent vectors of the codebook corresponding to a patch-decomposition (i.e., of a 3D model) and inferring patches rotations for reconstructing a 3D model (i.e., for reconstructing the 3D model of which patch-decomposition is represented by the input sequence). In other words, the first module is trained to infer which patches in the decomposition that are images of one another through a rotation. The first module may for example be trained to infer for each patch corresponding of a vector of the sequence a rotation quaternion. The second module is configured for taking as input the sequence of quantized latent vectors of the codebook corresponding to the patch-decomposition and inferring patches geometries for reconstructing a 3D model (i.e., for reconstructing the 3D model corresponding to the patch-decomposition). In other words, the second module is trained to infer the geometries of the patches in the decomposition. The second module may for that be trained to predict the occupancy of any given patch that correspond to any given vector of the sequence, which predicts the spatial region occupied by the patch. Training the decoder to reconstruct a 3D model (which is what the training teaches to the decoder) by inferring the orientation of each patch (which is what the first module does) together with inferring the occupancy of each patch allows to decode all the latent vectors into the patches of the 3D model and to infer patches which are the images of one another through rotation(s), translation(s), or combinations thereof, even if they are encoded by the same codebook vectors. As discussed hereinafter, the translation may be fixed and pre-defined (using the centers of the voxels $v_i$), and thus in this case there is no need to estimate the translation.

Examples of the decoder are now discussed. In these examples, the decoder may be denoted $D_\psi$, where $\psi$ are learnable parameters. The decoder $D_\psi$ is trained to map the quantized representations $$Z^q = \{z_i^q\}_i \in R^{k^3 \times D}$$

of a 3D model X into a corresponding implicit field of occupancy values. Since input patches $\{X_i\}_i$ are encoded separately, $D_\psi$ aims at capturing the global context from the separate region-based embeddings to recover pose and geometry estimations while ensuring global consistency. The decoder $D_\psi$ comprises two modules (also referred to as branches): the pose estimation branch $f_p$ (i.e., the first module) that recovers for each local region i the rotation quaternion $$R_i = [r_i^0, r_i^1, r_i^2, r_i^3],$$

and a geometry prediction branch $g_\lambda$ (i.e., the second module) that computes the occupancy value at a given point x. Formally, $\psi = \{\rho, \lambda\}$ and:

$$f_\rho : \{z_i^q\}_i \mapsto \{R_i\}_i$$

$$g_\lambda : (R_i, x, \{z_i^q\}_i) \mapsto o_x$$

This two-branches decomposition of the decoder allows $D_\psi$ to allocate its capacity not only for geometry prediction, but also for recovering patch orientations and ensuring global consistency. This avoids compromising $D_\psi$'s performance (because of the canonicalized formulation of the codebook) compared to conventional setting.

Producing canonicalized geometric forms simplifies the generation task of $g_\lambda$, and, hence, the branch-decomposition structure of the decoder allows not only to relieve the geometry decoder from the orientation bias, but it also allows it to focus on enhancing the intrinsic geometric features. As such, given a spatial point $x \in R^3$ belonging to a region i of center $v_i$, its occupancy value $o_x$ may be predicted as follows:

$$D_\psi(x, \{z_i^q\}_i) = g_\lambda(R_i(x - v_i), \{z_i^q\}_i) = o_x$$

In examples, the following modified version of the above formula may be used:

$$D_{\psi}(x, \{z_i^q\}_i) = \sum_{j \in \aleph_i} \frac{w_j}{\sum_j w_j} g_\lambda(R_j(x - v_j), \{z_i^q\}_i)$$

where $w_j$ is a weighting factor inversely proportional to the distance to the grid center $v_j$. In other words, the decoder interpolates the occupancy estimations from neighboring regions $x_i$ for points x close to the boundaries. This allows to avoid obtaining reconstructions that are discontinuous across patch boundaries.

The inventors have experimented with a wide range of $D_{\psi}$ designs, and tested, in particular, approaches that directly try to decode the geometry from the canonicalized representation, without explicitly estimating pose parameters. The inventors have noticed that this leads to a performance drop and poor accuracy, contrary to the above-discussed decoder design that includes rotation prediction branch, which provides sufficient accuracy.

The neural network as discussed above (i.e., comprising the decoder $D_{\psi}$ and the encoder which is the composition of the Tensor Field Network, the local encoder, and the quantization operator) and the codebook may form a RIVQ-VAE architecture illustrated in FIG. 1, which shows a diagram illustrating this architecture. As illustrated on FIG. 1, this architecture consists in (i) a local encoder that maps each surface patch into a rotation- and translation-invariant representation, (ii) a learnable codebook, and (iii) an implicit surface-based decoder consisting of a pose estimation block that recovers patch rotation vector, and a geometry prediction block that estimates shape occupancy field.

This architecture provides for a novel vector-quantized representation that captures a 3D shape via a sequence of discrete variables. RIVQ-VAE consists of an encoder that maps local regions of input point cloud independently into a discrete rotation- and translation-invariant latent representations, sampled from the learnable codebook, while an implicit decoder jointly maps the region-based discrete representations into a watertight mesh which matches the input point cloud. Such a compact representation notably allows to use the Transformer architecture (discussed in reference, Ashish Vaswani, Noam Shazeer, Niki Parmar, Jakob Uszkoreit, Llion Jones, Aidan N Gomez, Łukasz Kaiser, and Illia Polosukhin, "*Attention is all you need*", In I. Guyon, U. Von Luxburg, S. Bengio, H. Wallach, R. Fergus, S. Vishwanathan, and R. Garnett, editors, "*Advances in Neural Information Processing Systems*", volume 30. Curran Associates, Inc., 2017, which is incorporated herein by reference) to learn the autoregressive prior over the discrete representations enabling diverse generation tasks. The use of the Transformer architecture is further discussed hereinafter.

The learning comprises learning the neural network and the codebook, e.g., simultaneously. The learning comprises modifying the weights of the neural network and the coordinates' values of the vectors of the codebook until: 1) the encoder performs rotation-invariant (e.g., and translation-invariant) encoding of any patch of any 3D model of the training dataset into a quantized latent vector of the codebook, 2) the vectors of the codebook correspond to the vectors encoded (thus outputted) by the encoder, 3) the decoder decodes a sequence of quantized latent vectors of the codebook representing the encoding, by the encoder, of a patch-decomposition of any 3D model of the training dataset, into that 3D model, thereby reconstructing the 3D model, with sufficient reconstruction accuracy (e.g., with respect to a suitable reconstruction convergence criterion).

The learning may for that comprise minimizing a loss. In other words, the learning comprises modifying the weights of the neural network and the coordinates of the vectors of the codebook until the loss achieves a sufficiently low value (e.g., with respect to a suitable convergence criterion) when taking as input the samples of the training dataset. The loss comprises a reconstruction loss, which is a concept known per se in machine learning and which ensures that the encoder and the decoder are learnt so that the application of the encoder and then the decoder to an input 3D model outputs an accurate reconstruction of this 3D model. The loss further comprises a commitment loss. The concept of commitment loss is for example discussed in reference Aaron van den Oord, Oriol Vinyals, and koray kavukcuoglu, "*Neural discrete representation learning*", In Advances in Neural Information Processing Systems, 2017, which is incorporated herein by reference. The commitment loss rewards consistency between quantized latent vectors outputted by the encoder and vectors of the codebook. In other words, the commitment loss tends to achieve a low value when the encoder outputs quantized latent vectors which are consistent with the vectors of the codebook (e.g., which are close according to a suitable distance to the vectors of the codebook) and when the vectors of the codebook are consistent with the vectors outputted by the encoder (e.g., are close according to a suitable distance to the vectors of outputted by the encoder). In other words, the commitment loss tends to achieve a low value when the encoder outputs its values in the set of vectors of the codebook and when the vectors of the codebook include and are close with the image of the encoder on the training dataset.

The loss may be of the type:

$$\mathcal{L}(x; \phi, \psi, D) = \mathcal{L}_r(o_x, \sigma_x) + \beta \mathcal{L}_{VQ}(Z, Z^q)$$

where $\mathcal{L}_r$ is a reconstruction binary cross-entropy loss, $\mathcal{L}_{VQ}$ is a commitment loss, x represents a 3D point (i.e., of the 3D space, that may belong to a model (e.g., 3D point cloud) of the training dataset or to a volume outside the model), $\psi$ represents the parameter of the decoder, $\beta$ is a weighting parameter, $\widehat{\sigma}_x$ represents a ground truth occupancy for x, $o_x$ represents a predicted occupancy for x, $\phi$ represents the parameter of the encoder, and where $$\mathcal{L}_{VQ}(Z, Z^q) = \|Z - sg[Z^q]\|_2^2$$

where sg[.] denotes the stop-gradient operation, $$Z = \{z_i\}_i, Z^q = \{z_i^q\}_i,$$

where $z_i$ is a non-quantized encoding of patch $X_i$ and where $$VQ(z_i) = z_i^q = \mathrm{argmin}_{e \in D} \|z_i - e\|$$

where $D = \{e_k \in R^D\}$; k=1 . . . K is the codebook. The commitment loss makes sure that the encoder commits to the discrete latent distribution (i.e., the codebook) by encouraging the predicted codes Z to be close to the associated codebook vectors $Z^q$. The loss is applied to the training data and allows training the model to predict (i.e., classify) whether the point x belongs to the 3D model or is outside the 3D model.

It is also proposed a neural network function comprising a decoder and a codebook learnable according to the learning method. The neural network function is a computer-implemented neural network architecture that comprises a decoder and a codebook having their parameters and vector coordinates set according to the learning performed by the learning method. The neural network function may for example comprise a decoder and a codebook having been learnt according to the learning method. The neural network function may further comprise an encoder learnable (e.g., having been learnt) according to the learning method. The function may thus comprise the previously-discussed RIVQ-VAE architecture as learnt by the learning method. The neural network function may further comprise a transformer neural network learnable according to the learning method or learnable according to the method of use, as discussed hereinafter, e.g., having been learnt by the learning method or the method of use, or several such transformers learnt for several input latent vectors as discussed hereinafter.

It is also proposed a method of use of the decoder and the codebook of the neural network function. Thus, the method of use is a method of use of the decoder and the codebook learnt by the learning method if the neural network function comprises the decoder and the codebook leant by the learning method. The learning method and the method of use may be performed separately and independently. Alternatively, the learning method and the method of use may be integrated into a same computer-implemented process. It is thus also proposed a computer-implemented process that comprises an offline stage followed by an online stage, the offline stage comprising or consisting in performing the learning method, the online stage comprising or consisting in performing the method of use. The method of use comprises obtaining a sequence of quantized latent vectors of the codebook, and applying the decoder to the sequence.

The method of use may be for performing shape completion, that is performing completion of an input 3D model that is a partial point cloud, or single view reconstruction, that is reconstructing a 3D model representing an object from an input single-view image of this object. The partial point cloud may stem from a scan of a real-world object that the partial point cloud partially represent. The method of use may comprise performing such scan as an initial step.

In these cases where the method of use is for performing shape completion or single view reconstruction, obtaining the sequence of quantized latent vectors comprises applying a transformer neural network. The transformer neural network is discussed hereinafter. It is a neural network configured for, given an input latent vector representing an input 3D model, generating a sequence of quantized latent vectors of the codebook that correspond to a patch-decomposition of the input 3D model. Applying the transformer neural network consists in applying the transformer neural network to the input latent vector for which the transformer neural network has been trained to generating a sequence of quantized latent vectors of the codebook that correspond to a patch-decomposition of the 3D model represented by this latent vector. This latent vector may thus correspond to an embedding of an image or point cloud representing the input 3D model, for example obtained using the PointNet or ResNet architecture as previously explained. The image may be a single-view image or the point cloud may be a partial point cloud.

The learning method or the method of use may further comprise learning the transformer neural network. In other words, the learning of the transformer neural network may be part of the learning method or may be part of the method of use. The transformer neural network may be comprised in the previously-discussed neural network. The transformer neural network is configured for, given an input latent vector representing an input 3D model, generating a sequence of quantized latent vectors of the codebook that correspond to a patch-decomposition of the input 3D model. In other words, the transformer neural network is configured to (i.e., trained to), given an input 3D model and an input latent vector (also referred to as "latent embedding") representing the 3D model (for example obtained using any suitable encoder architecture), predict/find the sequence of quantized latent vectors of the codebook that corresponds best to the input latent vector, for example in terms of a log-likelihood. The learning of the transformer neural network, when part of the learning method, may be performed after the learning of the codebook.

The transformer neural network may have the transformer architecture discussed in previously-cited reference, Ashish Vaswani, Noam Shazeer, Niki Parmar, Jakob Uszkoreit, Llion Jones, Aidan N Gomez, Łukasz Kaiser, and Illia Polosukhin, "*Attention is all you need*", In I. Guyon, U. Von Luxburg, S. Bengio, H. Wallach, R. Fergus, S. Vishwanathan, and R. Garnett, editors, "*Advances in Neural Information Processing Systems*", volume 30. Curran Associates, Inc., 2017, and initialized with the input latent vector. The transformer neural network may be the decoder part of an encoder-decoder architecture that also comprises an encoder configured to, given the input 3D model, determine the input latent vector. The encoder may have the ResNet architecture (discussed in reference Kaiming He, Xiangyu Zhang, Shaoqing Ren, and Jian Sun, "Deep residual learning for image recognition", In Proceedings of the IEEE Conference on Computer Vision and Pattern Recognition (CVPR), June 2016, which is incorporated herein by reference) if the input 3D model is an image, or the Local PointNet architecture (discussed in reference Charles R Qi, Hao Su, Kaichun Mo, and Leonidas J Guibas, "*Pointnet: Deep learning on point sets for 3d classification and segmentation*", Proc. Computer Vision and Pattern Recognition (CVPR), IEEE, 2017, which is incorporated herein by reference) if the input 3D model is a point cloud. The learning method or the method of use may learn only the transformer network, that is the decoder part of the architecture, or may alternatively learn both the decoder and encoder parts of the architecture.

The transformer neural network may be learnt as follows. Given an input 3D model $O$ such as a (e.g., partial) point cloud shape or image view, the method aims at modelling the distribution of plausible shape sequences to enable shape completion and single-view reconstruction tasks respectively. In other words, given such an observation $O$, the goal is to learn the distribution of the complete sequence $p(Z|O;\theta)$ where p designates the distribution of the discrete latent representation $Z \in R^{k3 \times D}$ conditioned on O, and $\theta$ denotes the learnable distribution parameters. The method may comprise auto-regressively model $p(Z|O;\theta)$ such that the factorized sequence distribution can be written as follows:

15

$$p(Z|O; \theta) = \prod_{i=1}^{L} p(z_k|Z_{<k}, O; \theta)$$

Figure 2:
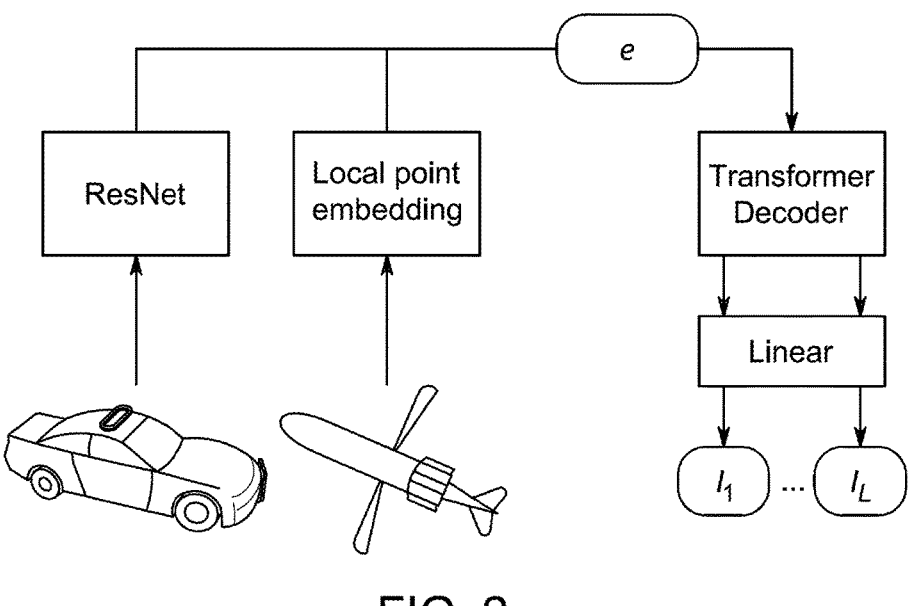

To learn $p(.;\theta)$, the method of use or the learning method may use the encoder-decoder architecture illustrated on FIG. 2. This architecture first projects the observation $O$ to an embedding space leading to the input latent vector/latent embedding e. The method uses the previously-discussed ResNet or Local PointNet architectures as backbones to process the input image or point cloud observation (respectively). The method of use or the learning method then initializes the transformer neural network with e token to sequentially predict the complete target representation $Z=\{z_i\}_{i=1 \dots L}$. The training is performed with the training objective to maximize the log-likelihood given $O$ and $Z$:

$$\mathcal{L} = -\log p(Z|O; \theta) \qquad 20$$

At inference time/online stage, given a partial point cloud or a single image view $O$, the corresponding shape representation Z may sequentially sampled following the top-p technique (discussed in reference Ari Holtzman, Jan Buys, Li Du, Maxwell Forbes, and Yejin Choi, "*The curious case of neural text degeneration*", In International Conference on Learning Representations, 2020, which is incorporated herein by reference) where the code index is selected from the set of indices of which probability sum exceeds a threshold p.

It is to be understood that the learning of the transformer neural network may be repeated for several input latent vectors representing several input 3D models (e.g., single-view images or partial point clouds), in which case several transformer neural networks are learnt each for a different and respective input latent vector (i.e., to a given latent vector corresponds a given transformer neural network learnt to generate a sequence of quantized latent vectors of the codebook that correspond to a patch-decomposition of the input 3D model represented by this latent vector).

The method may alternatively be for shape reconstruction, that is for a given input 3D model, reconstructing the model using the encoder, the decoder, and the codebook. In this case, obtaining the sequence comprises applying the encoder to a patch-decomposition of an input 3D model. This consists in applying the encoder to each patch, thereby yielding to quantized latent vectors representing the different patches and altogether forming the sequence. The decoder is then applied to this sequence and thus reconstruct the input 3D model.

Implementations and tests of the methods and the neural network are now discussed.

In these implementations, the training dataset consists in 3D models (about 35k models) taken from ShapeNet (discussed in reference Angel X. Chang, Thomas Funkhouser, Leonidas Guibas, Pat Hanrahan, Qixing Huang, Zimo Li, Silvio Savarese, Manolis Savva, Shuran Song, Hao Su, Jianxiong Xiao, Li Yi, and Fisher Yu, "*ShapeNet: An information-rich 3D model repository*", arXiv preprint, December 2015, which is incorporated herein by reference). The models represent objects of 13 categories (airplane, bench, cabinet, car, chair, display, lamp, speaker, rifle, sofa, table, phone and watercraft). The learning is performed on these models using the train/test splits provided by reference Qiangeng Xu, Weiyue Wang, Duygu Ceylan, Radomir Mech, and Ulrich Neumann. "*Disn: Deep implicit surface network for high-quality single-view 3d reconstruction*", In H. Wallach, H. Larochelle, A. Beygelzimer, F. d'Alch'e-Buc, E. Fox, and R. Garnett, editors, Advances in Neural Information Processing Systems, volume 32. Curran Associates, Inc., 2019, which is incorporated herein by reference.

For evaluation of the tests, the common reconstruction metrics Chamfer distance (CD), Earth moving distance (EMD) and F-score %1 (F1), discussed in reference Maxim Tatarchenko*, Stephan R. Richter*, Ren'e Ranftl, Zhuwen Li, Vladlen Koltun, and Thomas Brox, "*What do single-view 3d reconstruction networks learn?*", In Proceedings of the IEEE Conference on Computer Vision and Pattern Recognition (CVPR), 2019, which is incorporated herein by reference, are used.

Tests for Shape Reconstruction

As a first experiment, the inventors have measured the reconstruction performance of the learnt neural network to emphasize how the finite latent space can incorporate different geometric configurations to accurately represent test shapes. For a relevant evaluation, the present method has been compared to AutoSDF (discussed in reference Paritosh Mittal, Yen-Chi Cheng, Maneesh Singh, and Shubham Tulsiani. "*AutoSDF Shape priors for 3d completion, reconstruction and generation*", In CVPR, 2022) and Shape-Former-res8 (discussed in reference Xingguang Yan, Liqiang Lin, Niloy J. Mitra, Dani Lischinski, Danny Cohen-Or, and Hui Huang. "*Shapeformer: Transformer-based shape completion via sparse representation*", In Proceedings of the IEEE/CVF Conference on Computer Vision and Pattern Recognition, 2022) that have the following settings: codebook size N=512, latent space resolution k=8 and latent code size D=256. Table 1 below shows the reconstruction results obtained by the AutoSDF and ShapeFormer models and those obtained by the present RIVQ-VAE model according to the presently-discussed implementations.

TABLE 1

| Quantitative results for shape auto-encoding. CD and EMD are multiplied by $10^2$ | | | |
|---|---|---|---|
| Model | CD | EMD | F1 |
| AutoSDF | 0.182 | 2.852 | 0.615 |
| ShapeFormer-8 | 0.195 | 2.924 | 0.564 |
| RIVQ-VAE | 0.120 | 2.602 | 0.707 |

Figure 3:
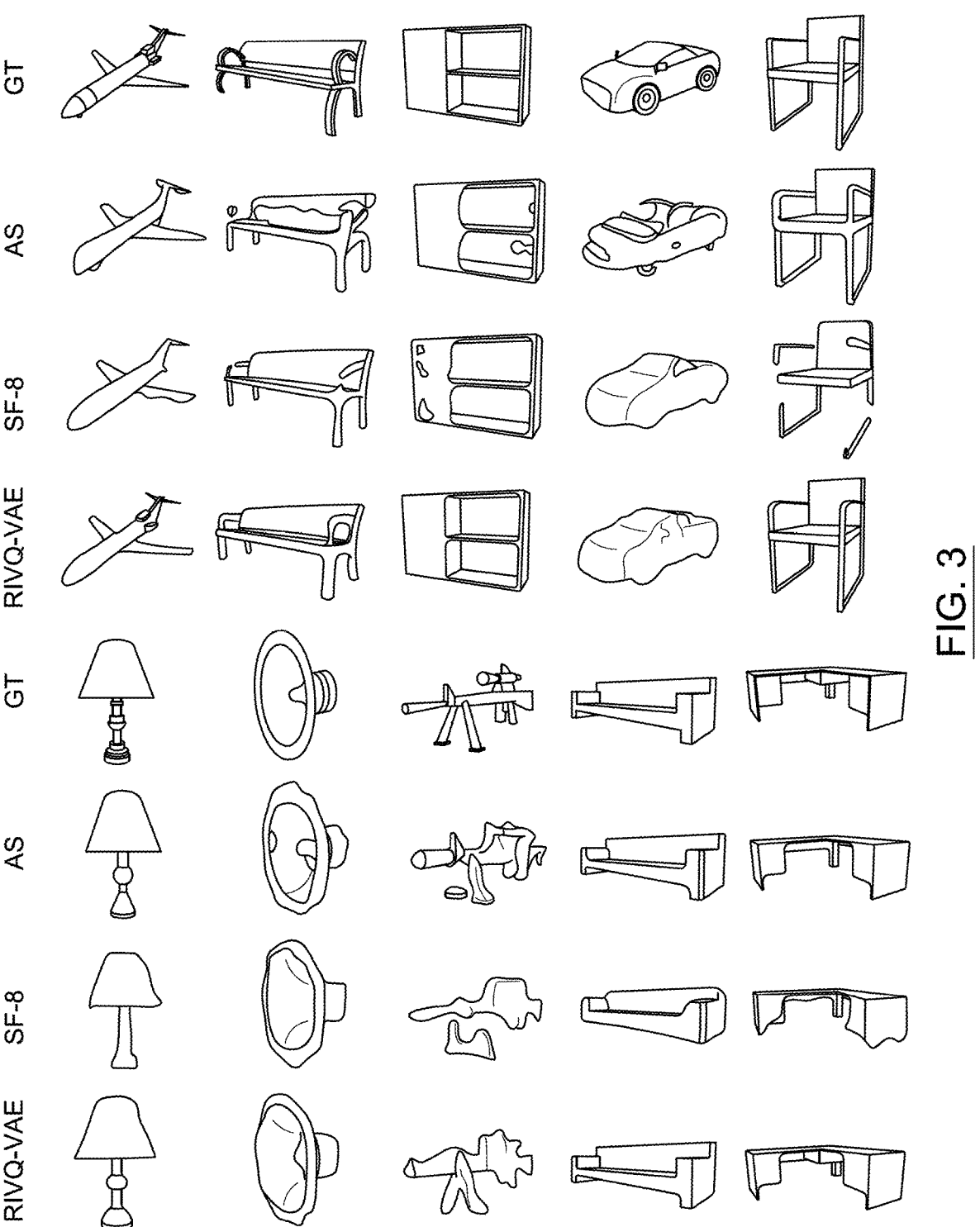
Figure 4:
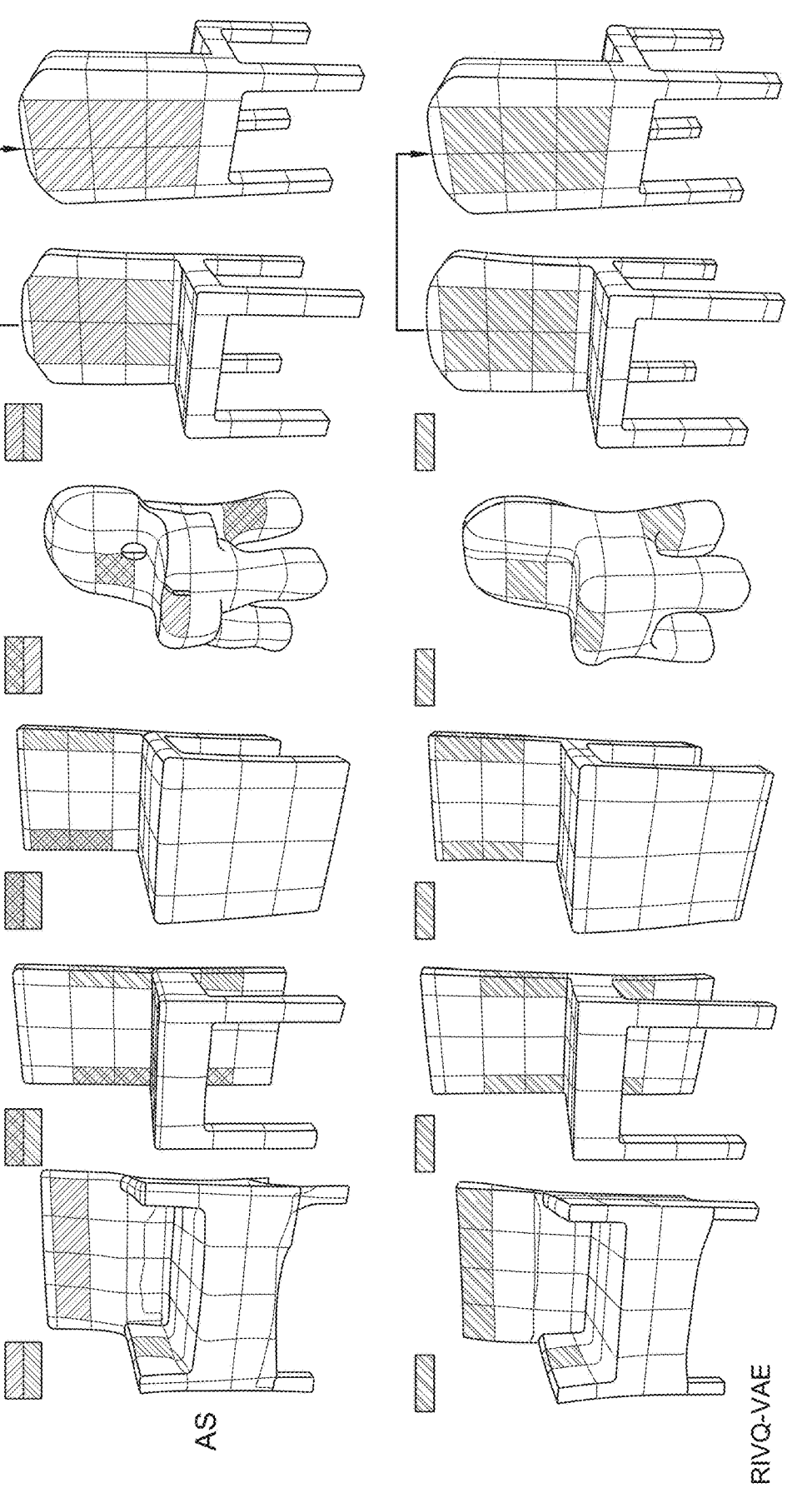

For different metrics, the implementations obtain meshes using Marching Cubes from SDF voxels of resolution 64^3 for AutoSDF and from implicit functions sampled at 128^3 for ShapeFormer-8 and RIVQ-VAE. 50k surface points have been used for CD and F1, and 8096 for EMD evaluations. Under similar settings, RIVQ-VAE outperforms baseline methods across different metrics. This is further supported by qualitative reconstruction results illustrated on FIG. 3. Specifically, FIG. 3 shows the ground truth objects (GT) and their reconstructions by the present RIVQ-VAE model, and the AutoSDF (AS) and ShapeFormer (SF-8) models. The reconstructions performed by the present implementations have an improved quality, notably as canonicalized formulation of the presence codebook promotes the diversity of the latent space. For illustration, FIG. 4 shows how the present implementations allows to compactly represent similar geometries up to rigid transformations, which inherently leads the learned codebook to capture more diverse geometric forms. On FIG. 4, for each single shape, patches with same hatches are represented by the same codebook index. While baseline approach (first row) consumes multiple indices for representing similar rotated geometries, the present method (second row) leverages these similarities for a more compact and efficient representation.

Tests for Single-View Reconstruction

Figure 5:
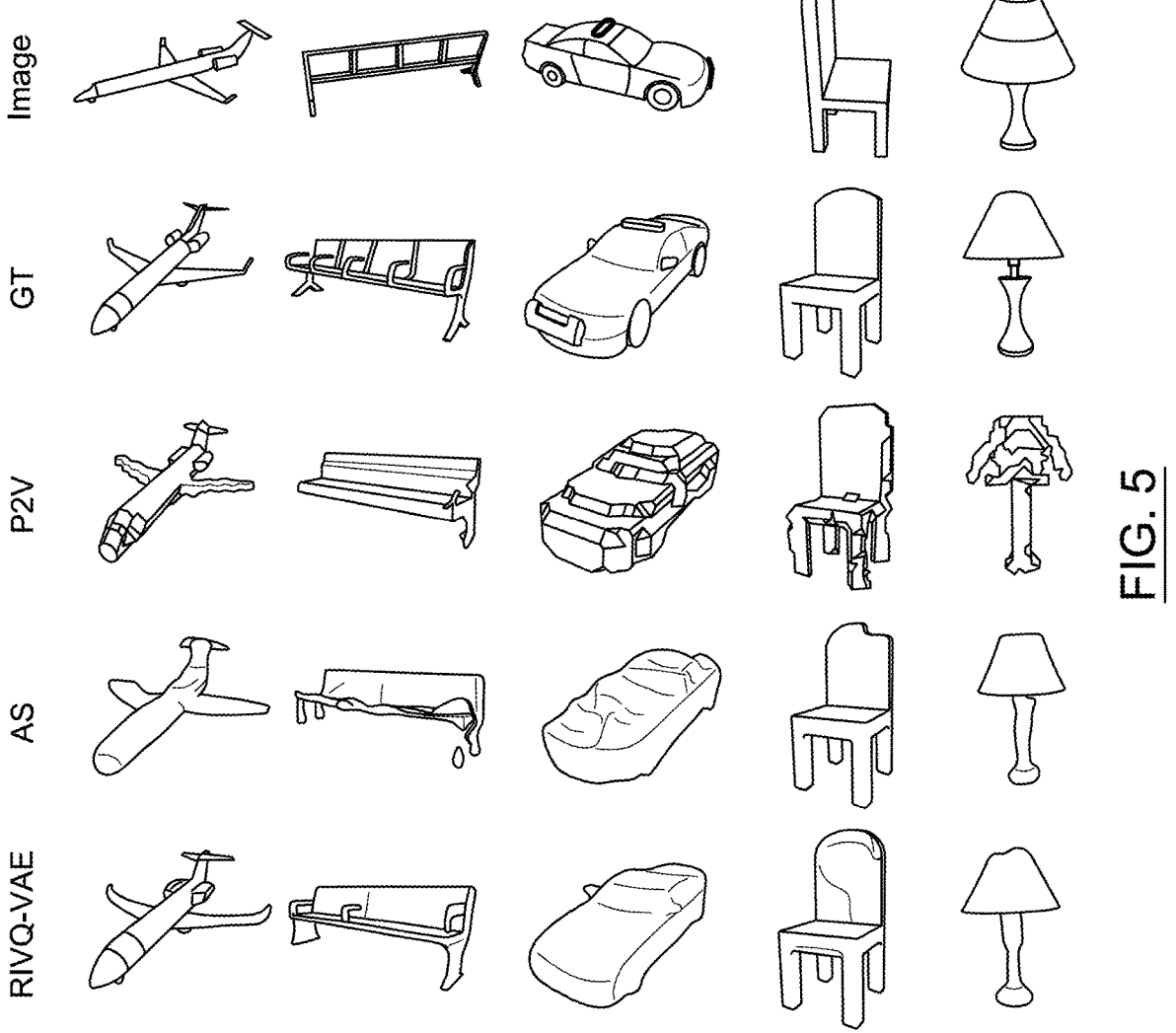

As a second test, the inventors have compared the results obtained by the present implementations for the task of single view reconstruction with the previously-discussed AutoSDF model and baseline global based-method Pix2Vox (discussed in reference Haozhe Xie, Hongxun Yao, Xiaoshuai Sun, Shangchen Zhou, and Shengping Zhang, "*Pix2vox: Context-aware 3d reconstruction from single and multi-view images*", In Proceedings of the IEEE/CVF International Conference on Computer Vision (ICCV), 2019). Table 2 below and FIG. 5 show quantitative and qualitative results respectively.

TABLE 2

Quantitative results for image reconstruction.
CD and EMD are multiplied by $10^2$.

| Model | CD | EMD | F1 |
|---|---|---|---|
| Pix2Vox | 4.301 | 9.819 | 0.243 |
| AutoSDF | 0.871 | 5.040 | 0.404 |
| RIVQ-VAE | 0.740 | 4.707 | 0.468 |

FIG. 5 shows the input single-view images (row "Image"), the ground truth model (GT) and the results of the Px2Vox, AutoSDF and RIVQ-VAE models.

Figure 6:
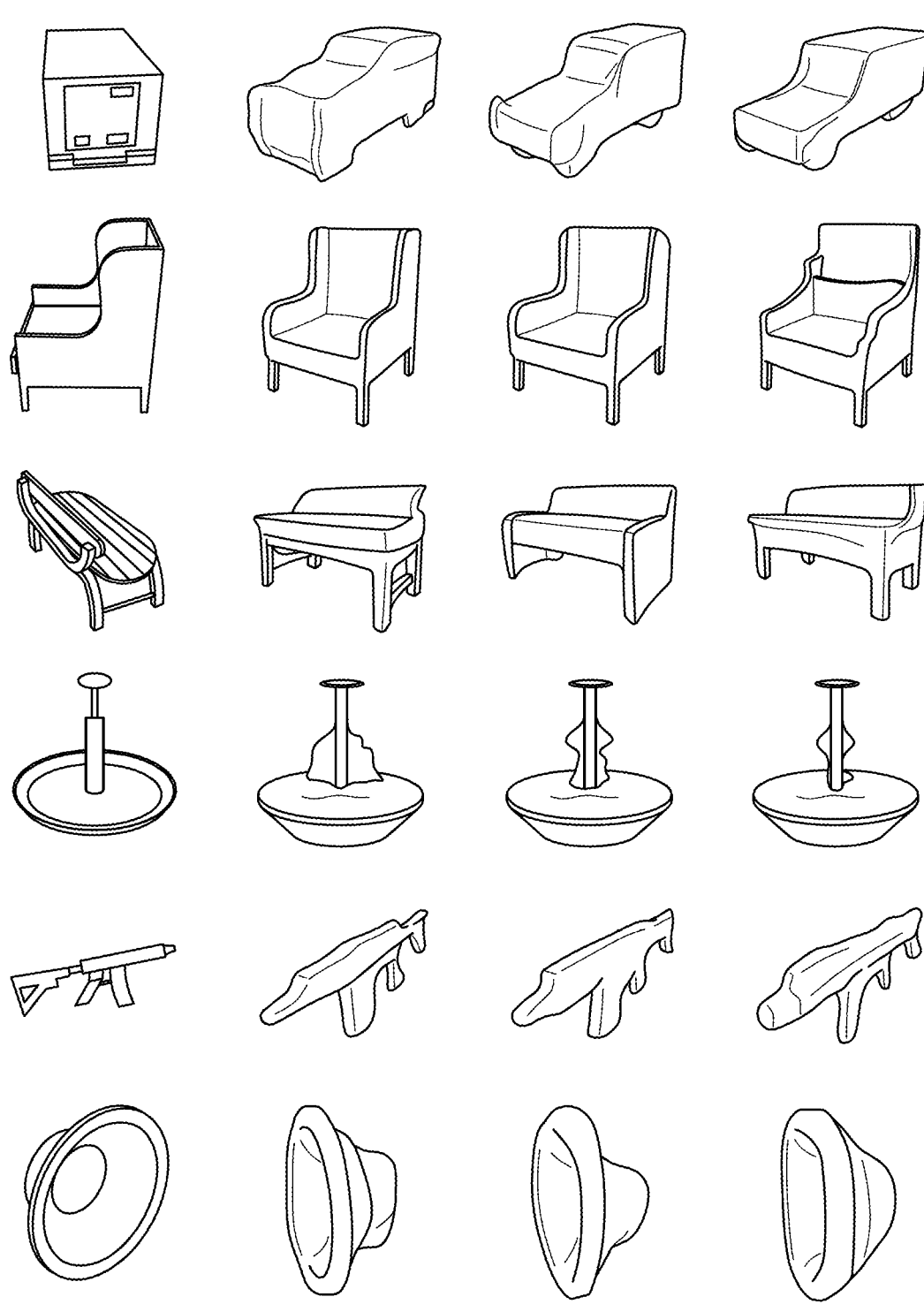

These results show that the present implementations produce higher quality reconstructions across different metrics, due to the high quality representation enabled by RIVQ-VAE as highlighted in the reconstruction experiments above, and whose benefits extend to downstream tasks. Importantly, the results demonstrate that the proposed canonicalized latent space formulation can be efficiently leveraged for learning auto-regressive models, and that the present decoder can accurately rotate and assemble diverse local sequences into plausible global geometries. Moreover, by leveraging the auto-regressive prior, the present method allows to sample multiple plausible solutions for a single input image, as illustrated for example on FIG. 6. FIG. 6 shows qualitative results for single view reconstruction, and illustrate that given an input image, the present implementations can sample multiple reconstructions.

Tests for Shape Completion

The inventors have evaluated the shape completion scheme (i.e., performed by the method of use) on partial observations that have been synthetically generated by cropping random regions from test shapes. The results have been compared to the previously-discussed baseline Shape-Former-8 approach. To this end, a test set of partial point clouds has been built by cropping random regions from test shapes. For each model, the inventors sampled three shape completion solutions conditioned on a given input partial point cloud based on the learned latent space distribution. For evaluation, the Total Mutual Difference (TMD) metric has been used to measure diversity, the Unidirectional Hausdorff Distance (UHD) to measure faithfulness toward input and the Minimal Matching Distance (MMD) (discussed in reference Panos Achlioptas, Olga Diamanti, Ioannis Mitliagkas, and Leonidas J Guibas, "*Learning representations and generative models for 3d point clouds*", arXiv preprint arXiv:1707.02392, 2017, which is incorporated herein by reference) to capture plausibility and quality. The different metrics are computed based on 2048 randomly sampled surface points and averaged across the different categories. The quantitative and qualitative results are shown in Table 3 below and FIG. 7 respectively.

TABLE 3

Quantitative results for shape completion.
MMD are multiplied by $10^3$

| Model | TMD | UHD | MMD |
|---|---|---|---|
| ShapeFormer-8 | 0.014 | 0.042 | 5.463 |
| RIVQ-VAE | 0.033 | 0.055 | 5.102 |

Figure 7:
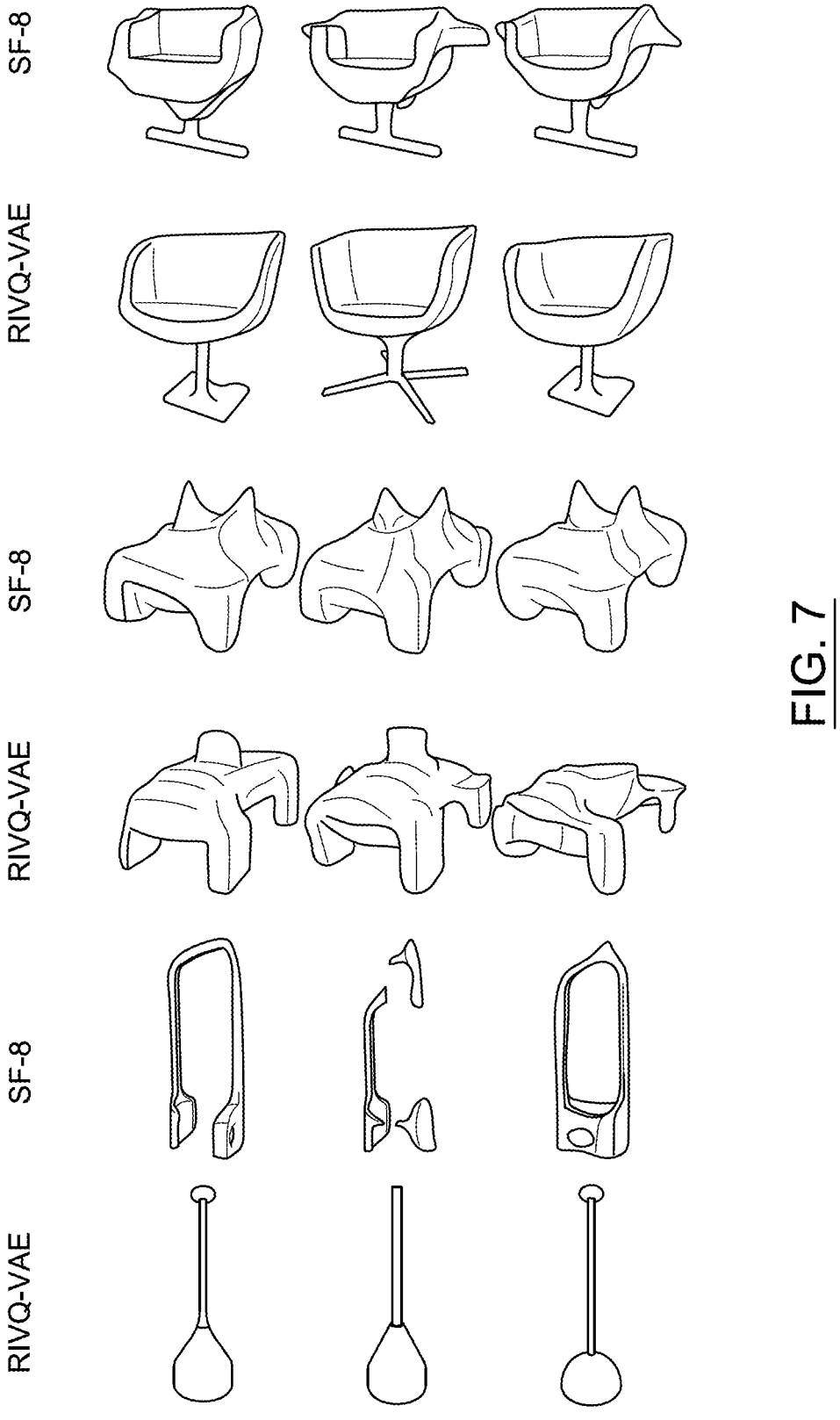

The present method achieves better diversity (higher TMD) while ensuring better geometric quality and plausibility (lower MMD). Note that ShapeFormer-8 yields closer shape completion results to partial input (lower UHD), but this is to be attributed this to the lower diversity of the generated content that inherently leads to less geometric shift. FIG. 7 clearly supports this explanation and the improvement brought by the present method in terms of offering diverse completion candidates. Importantly, as stated by MMD evaluations, this diversity is achieved while ensuring geometric plausibility. FIG. 7 shows qualitative results for shape completion. Given an input partial point cloud (left), FIG. 7 shows the comparison between shape completion solutions returned by ShapeFormer-8 (SF-8) and the present implementations (RIVQ-VAE).

Figure 8:
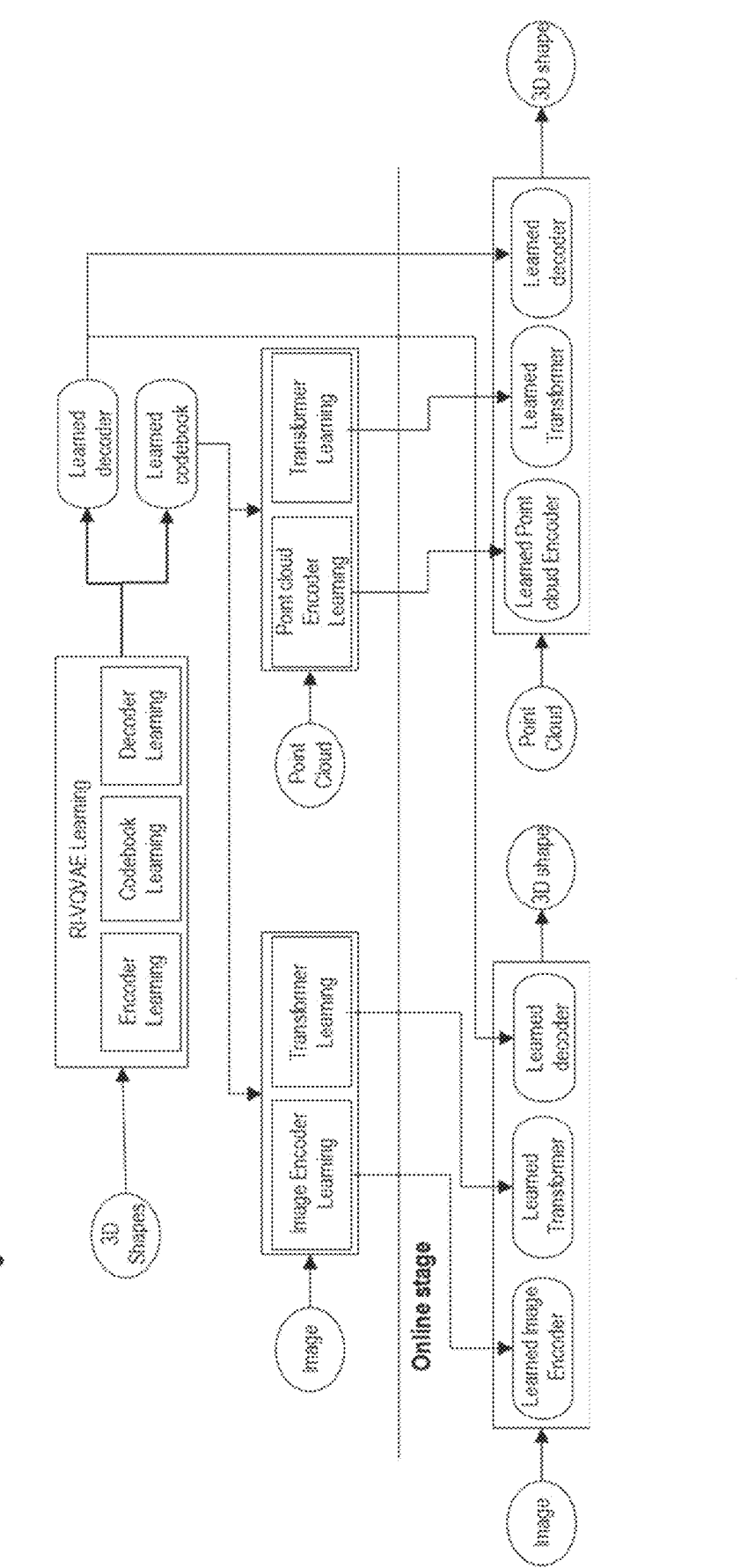

FIG. 8 shows a flowchart of an example implementation of a process comprising the learning method as the offline stage and the method of use as the online stage.

Additional Definitions

Total Mutual Difference (TMD) Completion diversity computes the diversity between the completed shapes. It is computed using the Total Mutual Difference. Given k completions for a partial input, for each completion, it is computed the average of its CD to other k−1 completions. TMD is the sum over the k completions.

Unidirectional Hausdorff Distance (UHD) computes how much are the partial input is altered during the completion. It is computed as the average Unidirectional Hausdorff Distance from the partial input to the completed outputs. UHD is computed from the partial point cloud $P=\{p_1, p_2, \ldots, p_n\}$ to the complete point cloud $C=\{c_1, c_2, \ldots, c_m\}$ as:

$$UHD(P, C) = \max_{p \in P} \min_{c \in C} \|p - c\|.$$

Representation of shapes: stands for the shape's degrees of freedom that are used to modify its spatial layout. This ranges from having full control of the 3D shape geometry to defining a reduced number of shape's degrees of freedom to either make shape modification tractable or to enforce some structural constraints. The present disclosure proposes a parametrization produced by a neural network. The latter learns to map a latent space to a distribution of complex 3D shapes. Modifying 3D shapes hence boils down to modifying its parametrization vector.

The methods are computer-implemented. This means that steps (or substantially all the steps) of the methods are executed by at least one computer, or any system alike. Thus, steps of the methods are performed by the computer, possibly fully automatically, or, semi-automatically. In examples, the triggering of at least some of the steps of the methods may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g., one for the program, and possibly one for the database).

FIG. 9 shows an example of the system, wherein the system is a client computer system, e.g., a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method. The computer program may alternatively be stored and executed on a server of a cloud computing environment, the server being in communication across a network with one or more clients. In such a case a processing unit executes the instructions comprised by the program, thereby causing the method to be performed on the cloud computing environment.

The invention claimed is:

1. A computer-implemented method of machine-learning, the method comprising:
   obtaining a training dataset of 3D models of real-world objects; and
   learning, based on the training dataset and on a patch-decomposition of the 3D models of the training dataset, a finite codebook of quantized vectors and a neural network, the neural network including:
      a rotation-invariant encoder configured for rotation-invariant encoding of a patch of a 3D model into a quantized latent vector of the codebook, and
      a decoder configured for decoding a sequence of quantized latent vectors of the codebook, the sequence corresponding to a patch-decomposition, into a 3D model.

2. The computer-implemented method of claim 1, wherein the encoder is translation-invariant and rotation-invariant and is configured for translation-invariant and rotation-invariant encoding of a patch of a 3D model of the training dataset into a quantized latent vector of the codebook.

3. The computer-implemented method of claim 1, wherein the decoder includes:
   a first module configured for taking as input a sequence of quantized latent vectors of the codebook corresponding to a patch-decomposition and inferring patches rotations for reconstructing a 3D model; and
   a second module configured for taking as input the sequence of quantized latent vectors of the codebook corresponding to the patch-decomposition and inferring patches geometries for reconstructing a 3D model.

4. The computer-implemented method of claim 1, wherein the learning further comprises minimizing a loss, the loss including a reconstruction loss and a commitment loss, the commitment loss rewarding consistency between quantized latent vectors outputted by the encoder and vectors of the codebook.

5. The computer-implemented method of claim 4, wherein the loss is of a type:

$$\mathcal{L}(x; \phi, \psi, D) = \mathcal{L}_r(o_x, \sigma_x) + \beta\mathcal{L}_{VQ}(Z, Z^q)$$

where $\mathcal{L}_r$ is a reconstruction binary cross-entropy loss, $\mathcal{L}_{VQ}$ is a commitment loss, x represents a 3D point, $\psi$ represents a parameter of the decoder, $\beta$ is a weighting parameter, $\sigma_x$ represents a ground truth occupancy for x, $o_x$ represents a predicted occupancy for x, $\phi$ represents the parameter of the encoder, and where $$\mathcal{L}_{VQ}(Z, Z^q) = \|Z - sg[Z^q]\|_2^2$$

where sg[.] denotes a stop-gradient operation, $$Z = \{z_i\}_i,\ Z^q = \{z_i^q\}_i,$$

where $z_i$ is a non-quantized encoding of patch $X_i$ and where $$VQ(z_i) = z_i^q = \mathrm{argmin}_{e \in D}\|z_i - e\|$$

where $D = \{e_k \in R^D\}$; $k = 1 \ldots K$ is the codebook.

6. A computer-implemented method of applying a decoder and a codebook learnable according to a machine-learning including obtaining a training dataset of 3D models of real-world objects and learning, based on the training dataset and on a patch-decomposition of the 3D models of the training dataset, a finite codebook of quantized vectors and a neural network, the neural network including: a rotation-invariant encoder configured for rotation-invariant encoding of a patch of a 3D model into a quantized latent vector of the codebook, and a decoder configured for decoding a sequence of quantized latent vectors of the codebook, the sequence corresponding to a patch-decomposition, into a 3D model, the method comprising:

obtaining a sequence of quantized latent vectors of the codebook; and applying the decoder to the sequence.

7. The computer-implemented method of claim 6, wherein obtaining the sequence further comprises:

applying a transformer neural network to obtain the sequence, the transformer neural network being configured for, given an input latent vector representing an input 3D model, generating a sequence of quantized latent vectors of the codebook that correspond to a patch-decomposition of the input 3D model.

8. The computer-implemented method of claim 7, wherein the latent vector representing the input 3D model corresponds to an embedding of an image or point cloud representing the input 3D model.

9. The computer-implemented method of claim 8, wherein the image is a single-view image or the point cloud is a partial point cloud.

10. The computer-implemented method of claim 6, wherein obtaining the sequence further comprises applying the encoder to a patch-decomposition of an input 3D model.

11. The computer-implemented method of claim 6, further comprising learning a transformer neural network.

12. A device comprising:

a non-transitory computer-readable data storage medium having recorded thereon a computer program having instructions for performing machine-learning that when executed by a processor causes the processor to be configured to:

obtain a training dataset of 3D models of real-world objects, and learn, based on the training dataset and on a patch-decomposition of the 3D models of the training dataset, a finite codebook of quantized vectors and a neural network, the neural network including: a rotation-invariant encoder configured for rotation-invariant encoding of a patch of a 3D model into a quantized latent vector of the codebook, and a decoder configured for decoding a sequence of quantized latent vectors of the codebook, the sequence corresponding to a patch-decomposition, into a 3D model, and/or applying a decoder and a codebook learnable according to the machine-learning that when executed by the processor causes the processor to be configured to:

obtain a sequence of quantized latent vectors of the codebook, and apply the decoder to the sequence.

13. The device of claim 12, wherein the encoder is translation-invariant and rotation-invariant and is configured for translation-invariant and rotation-invariant encoding of a patch of a 3D model of the training dataset into a quantized latent vector of the codebook.

14. The device of claim 13, wherein the processor coupled to the data storage medium.

15. The device of claim 12, wherein the decoder includes:

a first module configured for taking as input a sequence of quantized latent vectors of the codebook corresponding to a patch-decomposition and inferring patches rotations for reconstructing a 3D model; and a second module configured for taking as input the sequence of quantized latent vectors of the codebook corresponding to the patch-decomposition and inferring patches geometries for reconstructing a 3D model.

16. The device of claim 15, wherein the processor coupled to the data storage medium.

17. The device of claim 12, wherein the processor is further configured to learn by being configured to minimize a loss, the loss including a reconstruction loss and a commitment loss, the commitment loss rewarding consistency between quantized latent vectors outputted by the encoder and vectors of the codebook.

18. The device of claim 17, wherein the loss is of a type:

$$\mathcal{L}(x; \phi, \psi, D) = \mathcal{L}_r(0_x, \sigma_x) + \beta \mathcal{L}_{VQ}(Z, Z^q)$$

where $\mathcal{L}_r$ is a reconstruction binary cross-entropy loss, $\mathcal{L}_{VQ}$ is a commitment loss, x represents a 3D point, $\psi$ represents a parameter of the decoder, $\beta$ is a weighting parameter, $\sigma_x$ represents a ground truth occupancy for x, $o_x$ represents a predicted occupancy for x, $\phi$ represents a parameter of the encoder, and where $$\mathcal{L}_{VQ}(Z, Z^q) = \|Z - sg[Z^q]\|_2^2$$

where sg[.] denotes a stop-gradient operation, $$Z = \{z_i\}_i,\ Z^q = \{z_i^q\}_i,$$

where $z_i$ is a non-quantized encoding of patch $X_i$ and where $$VQ(z_i) = z_i^q = \mathrm{argmin}_{e \in D}\|z_i - e\|$$

where $D = \{e_k \in R^D\}$; $k = 1 \ldots K$ is the codebook.

19. The device of claim 12, wherein the processor is further configured to obtain the sequence by being further configured to:

apply a transformer neural network to obtain the sequence, the transformer neural network being configured for, given an input latent vector representing an input 3D model, generating a sequence of quantized latent vectors of the codebook that correspond to a patch-decomposition of the input 3D model.

20. The device of claim 12, wherein the processor coupled to the data storage medium.

\* \* \* \* \*